July 4, 1944.  H. N. RIDER  2,353,116
PRESSURE TANK SPRINKLER SYSTEM WITH SECONDARY SUPPLY
Filed July 13, 1942  6 Sheets-Sheet 2

Harry N. Rider
Inventor

By W. B. Harpman
Attorney

July 4, 1944.  H. N. RIDER  2,353,116
PRESSURE TANK SPRINKLER SYSTEM WITH SECONDARY SUPPLY
Filed July 13, 1942   6 Sheets-Sheet 5

Harry N. Rider
Inventor

By W. B. Harpman
Attorney

Patented July 4, 1944

2,353,116

UNITED STATES PATENT OFFICE 2,353,116

PRESSURE TANK SPRINKLER SYSTEM WITH SECONDARY SUPPLY

Harry N. Rider, Youngstown, Ohio, assignor to "Automatic" Sprinkler Company of America, Youngstown, Ohio, a corporation of Delaware Application July 13, 1942, Serial No. 450,659

11 Claims. (Cl. 169—9)

This invention relates to a sprinkler system designed for furnishing sprinkler protection to buildings located in areas where there is no city water supply available or where the city water supply is undependable, and is intended for occupancies that are not rated as hazardous risks or where only a limited number of sprinklers are expected to open before a fire is extinguished.

The principal object of this invention is the provision of a sprinkler system incorporating a pressure tank as a primary source of water supply and with means for bringing into the sprinkler system any auxiliary water supply that may be available.

A further object of the invention is the provision of a sprinkler system wherein the primary water supply source comprises a pressure tank wherein pressure within the tank results from the automatic release of compressed gases thereinto.

A still further object of the invention is the provision of a pressure tank sprinkler system adapted to make use of an auxiliary water supply, when the same is available, at such times as the system goes into operation as in controlling a fire.

The system comprises a conventional sprinkler system such as is well known in the art with its primary source of water supply comprising a tank in which pressure of expanded compressed gases released thereinto serves to force the water through the sprinkler system so as to control a fire. In addition thereto, a connection, controlled by an automatically actuated valve, establishes communication with an auxiliary water supply, such as may be available and which may comprise a private water system which may include an elevated tank or which may comprise a connection to an existing city or other water system.

Specifically, the principal novelty of the invention resides in the sprinkler system and the combination of the primary and secondary water supply sources and the means of bringing the same into active operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein.

This invention constitutes an improvement to that set forth in Patent No. 2,277,873 of March 31, 1942, on "Pressure tank sprinkler system."

Figure 1:
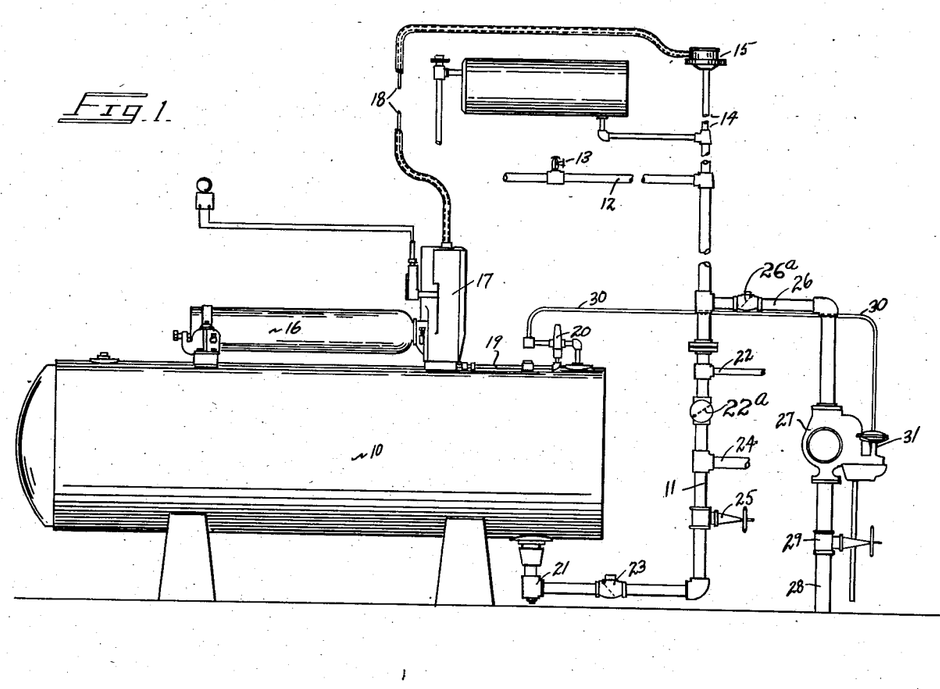
Figure 1 is a side elevation with parts broken away showing the complete organization of the pressure tank sprinkler system with secondary supply.

By referring to the drawings and Figure 1 in particular, it will be seen that a sprinkler system has been formed that is capable of providing automatic sprinkler protection for buildings and other enclosures located in areas where there is no city water supply or where the same is substandard. The sprinkler system comprises a storage tank 10 suitably connected to a riser 11 and a plurality of sprinklers 13 positioned on suitable sprinkler piping 12. The tank 10, the riser 11 and the piping 12 are filled with a suitable fire extinguishing fluid as is an upward extension 14 of the riser 11, which extends a short distance above the highest sprinkler of the sprinkler system as shown. The uppermost end of this upward extending section 14 of the riser 11 is provided with a suction chamber 15 which is shown in and described in the hereinabove mentioned Patent No. 2,277,873. In order that the opening of the sprinkler 13, or any other sprinkler which may be a part of the herein described system, will result in pressure being applied to the fluid contents of the tank 10, means has been provided whereby compressed gases, preferably nitrogen, may be released into the tank 10 through a suitable regulator so that the liquid contents of the tank 10 may be forced outwardly through the sprinklers so as to satisfactorily control a fire. Still referring to Figure 1, it will be observed that the tank 10 has removably mounted thereon a compressed gas cylinder 16 of a type commonly used in various industrial applications. The delivery end of the compressed gas cylinder 16 is positioned within a portion of a gas release mechanism generally indicated by the numeral 17, which mechanism is also connected by suitable tubing 18 to the suction chamber 15 atop the upward extension 14 of the riser 11 heretofore referred to. The delivery orifice of the compressed gas cylinder 16 communicates through the gas release mechanism 17, which incorporates a suitable pressure regulator, with the tank 10 by way of suitable tubular connection 19. A safety valve 20 is incorporated in the tubular connection 19 to eliminate by venting to the atmosphere, the possibility of accidental application of too great a pressure to the tank 10 and sprinkler system. Still referring to Figure 1, it will be observed that the riser 11 and its various parts communicating with the pressure tank 10 include a drain connection 21, a filling connection 22, through which a non-freezing solution may be supplied to the sprinkler system riser 11 and distributing pipes 12. A check valve 22A is positioned immediately thereinunder in the riser 11 to confine such non-freezing fluid to the riser 11 and distributing pipes 12, a check valve 23, a fire department connection 24 through which water may be pumped by a fire department, a manually operated master control valve 25 and an auxiliary or secondary water supply connection 26. The auxiliary or secondary water supply connection 26 comprises a tubular connection communicating with the uppermost portion of an automatic valve 27 which in turn controls the flow of fluid to the sprinkler system from a secondary fluid supply source 28. A secondary master control valve 29 controls the flow of fluid entering the system from the secondary supply source, both the master control valve 25 and the secondary master control valve 29 are normally open. In order that the automatic valve 27 controlling the secondary fluid supply may be caused to open at such times as the pressure tank sprinkler system goes into operation in controlling a fire, a tubular connection 30 is provided between the actuating portion 31 of the automatic valve 27 and the compressed gas conveying tubular connection 19 heretofore referred to.

At such times as fire occurs in the areas protected by the sprinkler system of this invention, and one or more of the sprinklers 13 opens permitting the discharge of fire extinguishing fluid from the fluid filled system, the suction chamber 15 originates a change in pressure which is conveyed by way of the tube 18 to the gas release mechanism 17 which in turn causes the contents of the compressed gas cylinder 16 to be released, through a suitable regulator, into the pressure tank 10, the compressed gases flowing by way of the tubular connection 19 which also communicates with the tubular connection 30 leading to the actuating portion 31 of the automatic valve 27 controlling the secondary fluid supply source. The compressed gas entering the pressure tank 10 will cause the fluid contents thereof to be discharged upwardly through the riser 11 and the sprinkler piping 12 and outwardly through the various sprinklers 13 thereon. Simultaneously, the compressed gas causes the automatic valve 27 to open and brings into communication with the sprinkler system riser 11 the fire extinguishing fluid from the secondary supply source 28. When this occurs the water from the secondary supply source may enter the sprinkler system riser 11 if the pressure thereof is in excess of that existing in the tank 10 and the riser 11. If the pressure thereof is lower than that originally existing in the tank 10 and the riser 11, as a result of the release of the compressed gases thereinto, the check valve 26a prevents water from the secondary supply from entering the system until a majority of the fluid contents of the pressure tank have been exhausted through the sprinkler system thereby lowering the pressure sufficiently to permit the water from the secondary supply source to enter the system.

Figure 2:
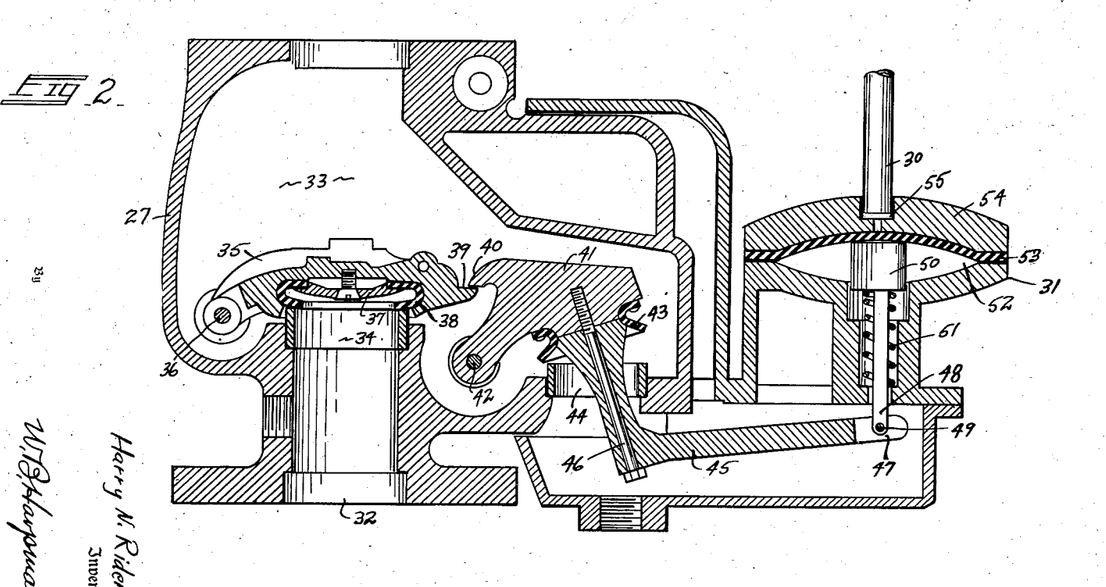
Figure 2 is a cross sectional elevation of an automatic valve shown in Figure 1.

By referring now to Figure 2 of the drawings, a cross sectional elevation of the automatic valve 27 and its actuating portion 31 may be seen. In Figure 2 the body portion of the valve 27 is indicated by the numeral 27 and an inlet orifice thereof is indicated by the numeral 32, the inlet orifice communicates with the interior 33 of the valve body 27 by way of a seat ring 34 which may be closed by means of a clapper 35, the clapper 35 being pivoted to the valve body 27 by means of a pivot 36. The clapper 35 includes in its construction a gasket retaining disc 37 which in turn positions a U shaped annular gasket 38 in satisfactory position for forming a tight closure between the interior 33 of the valve body 27 and the inlet orifice 32 thereof. The clapper 35 is provided with a latch portion 39 which is adapted to be retained beneath a keeper 40 forming a portion of a keeper mechanism 41 which in turn is pivoted to the valve body 27 by means of a pivot 42. A secondary U shaped annular gasket 43 is affixed to the keeper mechanism 41 and is adapted to register with, so as to close, a seat ring 44 forming one end of a passageway from the valve interior 33 through which passageway an L shaped bracket 45, which forms a part of the keeper mechanism 41, is positioned. A bolt 46 holds the assembly comprising the keeper mechanism 41 and the bracket 45, in one unit so that the outermost end of the L shaped bracket 45 may receive in a workable manner, motion imparted by a connecting rod 48 through a pivot 49, the connecting rod 48 being vertically positioned and adapted to receive motion from a piston block 50 which in turn forms a part of actuating mechanism 31 of the valve. The piston block 50 is normally urged upwardly as is the connecting rod 48 and the outermost end 47 of the L shaped bracket 45, by a coil spring 51 positioned about the connecting rod 48 between the piston block 50 and the lower wall of the actuating mechanism 31. Positioned immediately above the piston block 50 and across a cavity 52 in the actuating mechanism 31, there is a diaphragm 53 formed of rubber or other suitable resilient material which is normally positioned in the manner illustrated in Figure 2, immediately beneath a cap portion 54 of the actuating mechanism 31. A centrally positioned opening 55 is adapted to receive and retain the tubular connection 30 which as heretofore described, communicates with the tubular connection 19 which conveys the compressed gases from the gas release mechanism 17 to the tank 10.

Figure 3:
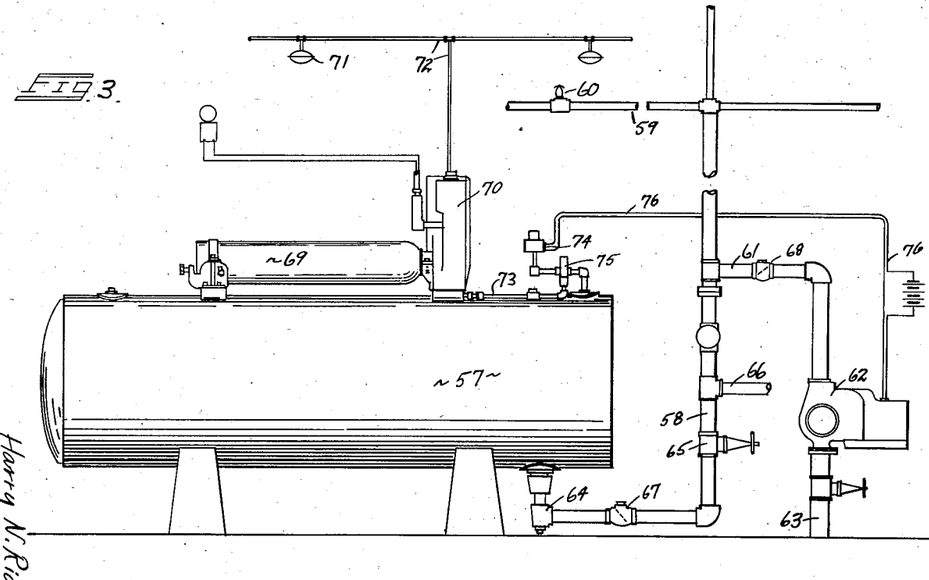
Figure 3 is a side elevation with parts broken away showing the complete organization of the pressure tank sprinkler system with secondary supply incorporating a modification adapting it for use with open sprinklers and heat actuated devices for bringing the system into operation.

In order that the pressure tank sprinkler system with secondary supply, which is the subject of this invention, may be used in furnishing fire protection for areas wherein open sprinklers are deemed necessary or desirable, the system may be constructed as illustrated in Figure 3 wherein a pressure tank 57 comprises the primary water supply, the tank 57 being suitably connected to a riser 58 and a plurality of open sprinklers 60 positioned on suitable sprinkler piping 59. The tank 57 and the lower portion of the riser 58 are filled with a suitable fire extinguishing fluid. A tubular connection 61 communicates with the riser 58 at a point above the fluid level therein and connects with the discharge orifice of an automatic valve 62 which in turn controls the entrance of fluid from a secondary supply source 63. The riser 58 is provided with various connections necessary including a drain or fill connection 64, a master control valve 65 and a fire department connection 66, check valves 67 and 68 are positioned in the riser 58 and the tubular connection 61 respectively. Positioned upon the tank 57 there is a compressed gas cylinder 69, the delivery end of which is inserted into and connected to a gas release mechanism 70. In this adaption of the invention, the gas release mechanism 70 is actuated by pressure generating heat actuated devices 71 which are connected by means of suitable tubing 72 to the gas release mechanism 70. The heat actuated pressure generating devices as well as a pressure responsive release mechanism incorporated in the compressed gas release mechanism 70 comprise in part the subject matter of Patent No. 2,099,069 of November 16, 1937, to E. A. Lowe et al. wherein their complete structure and operating principles are set forth. They are therefore well known in the art. In the present disclosure, an increase of pressure originated by the heat actuated devices 71 causes the gas release mechanism 70 to release the compressed gases from the cylinder 69 and discharge the same into the tank 57 by way of a tubular connection 73. A conventional pressure actuated switch 74 communicates with the tubular connection 73 as does a safety valve 75. It will thus be observed that at such times as a fire occurs in the area under supervision of the heat actuated devices 71, the compressed gases from the cylinder 69 will be discharged into the tank 57 and thus cause the fluid contents thereof to be discharged upwardly through the riser 58, the sprinkler piping 59 and from the open sprinklers 60, thus providing prompt and thorough sprinkler protection. It will also be observed that when the compressed gases are released from the cylinder 69, the pressure actuated switch 74 closes an electrical circuit through wires 76, 77 which also make connection with a power source 77' which electrical circuit actuates the automatic valve 62 controlling the secondary fluid supply source 63. The valve 62 is thus opened upon the application of pressure to the fluid contents of the tank 57 and such fluid supply as may communicate with the secondary source connection 63 is thus automatically brought into connection with the sprinkler system riser 58 by way of the automatic valve 62 and the tubular connection 61. The check valve 68 prevents fluid from the secondary source from entering the riser 58 until the pressure of the primary fluid becomes less than the pressure of the secondary fluid. Thus, the sprinkler system may make use of both the fluid contents of the tank 57 and such other fluid supply as may be available.

It will be seen that the sprinkler system illustrated in Figure 3, and heretofore described as being equipped with open sprinklers 60, may also be formed as a preaction sprinkler system by utilizing conventional fused sprinklers. Such a system, actuated by the heat actuated devices 71, detects a fire and delivers the fire extinguishing fluid to the sprinklers in advance of their actual opening, thus, at such times as the sprinklers do fuse and open, the fluid is immediately available for discharge.

Figure 4:
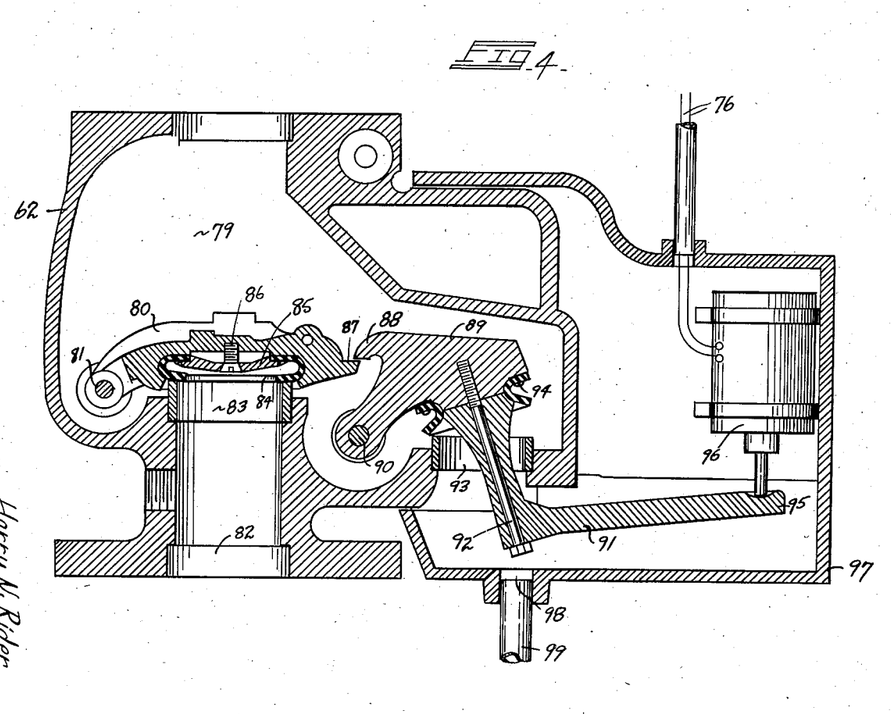
Figure 4 is a cross sectional elevation of an electrically actuated automatic valve shown in Figure 3.

By referring now to Figure 4 a cross sectional elevation of the automatic valve 62 forming a part of the invention as illustrated in Figure 3 may be seen, the valve 62 being positioned in the tubular connection 61 communicating with the riser 58 of the sprinkler system and with the secondary supply source 63 and controlling the entrance of fire extinguishing fluid from the secondary supply 63. The valve comprises a body portion which is indicated by the number 62 forming a chamber 79 therein in which a clapper 80 is positioned by means of a pivot 81 which also engages the valve body 62. The clapper 80 is adapted to close an inlet orifice 82 which orifice communicates with the valve chamber 79 by way of a seat ring 83 which in turn is adapted to receive an annular U shaped gasket 84 which is affixed to the clapper 80 by means of a disc 85. The disc 85 is affixed to the clapper by means of a centrally positioned screw 86. A latch portion 87 formed on the clapper 80 extends outwardly to one side and is adapted to be retained under a keeper 88 forming a part of a keeper mechanism 89 which in turn is pivoted to the valve body 62 by means of a pivot 90. An L shaped bracket 91 is affixed to and forms a part of the keeper mechanism 89 being bolted thereto by means of a bolt 92, the L shaped bracket 91 extending downwardly through a secondary seat ring 93 which is positioned in an opening in the valve body 62 which opening is adapted to be closed by means of the keeper mechanism 89 and a secondary annular U shaped gasket 94 affixed thereto. At such times as the clapper 80 is open the keeper mechanism 89 and the U shaped annular gasket 94 are adapted to register with and thereby close the opening through the seat ring 93. In order that motion may be imparted to the keeper mechanism 89 through the L shaped bracket 91, the outermost end 95 thereof is adapted to receive motion imparted thereto by a solenoid 96, the solenoid 96 being of a size to be capable of exerting sufficient energy upon the end 95 of the L shaped bracket 91 to move the keeper 88 away from the latch 87 formed on the clapper 80. As has heretofore been explained with respect to the modified form of the invention illustrated in Figure 3, the pressure actuated switch 74 connected to the tubular connection 73 which conveys the compressed gases from the cylinder 69 to the tank 57 closes an electrical circuit through wires 76, 77 which wires in turn connect with the solenoid 96. The solenoid 96 as well as the L shaped lever 91 are enclosed in a housing 97 which is provided with an opening 98 adapted to receive a drain pipe 99. The drain is provided so that any liquid passing through the opening formed by the seat ring 93 in the valve body 62 will be automatically drained away from this portion of the device.

Figure 5:
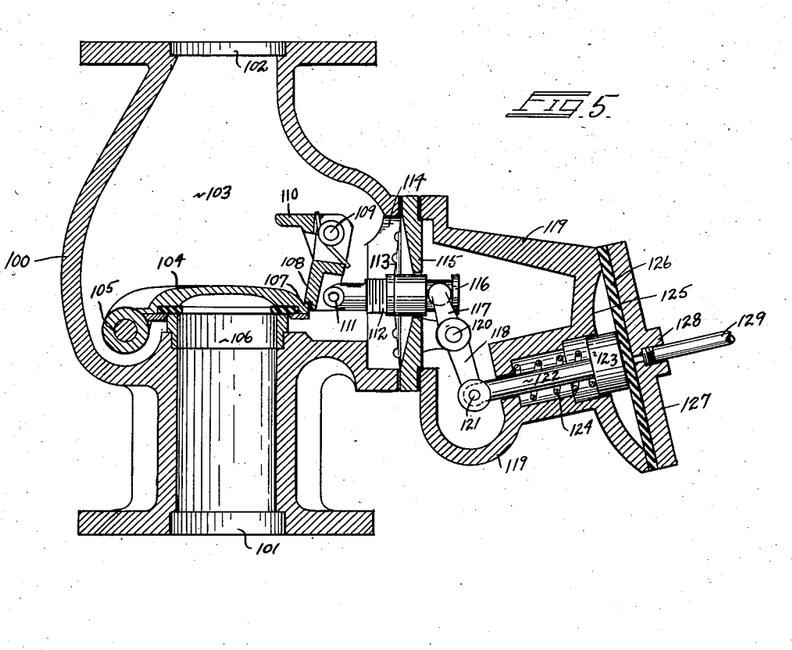
Figure 5 is a cross sectional elevation of a modified form of pneumatically actuated valve capable of being used with the sprinkler system illustrated in Figure 1.
Figure 6:
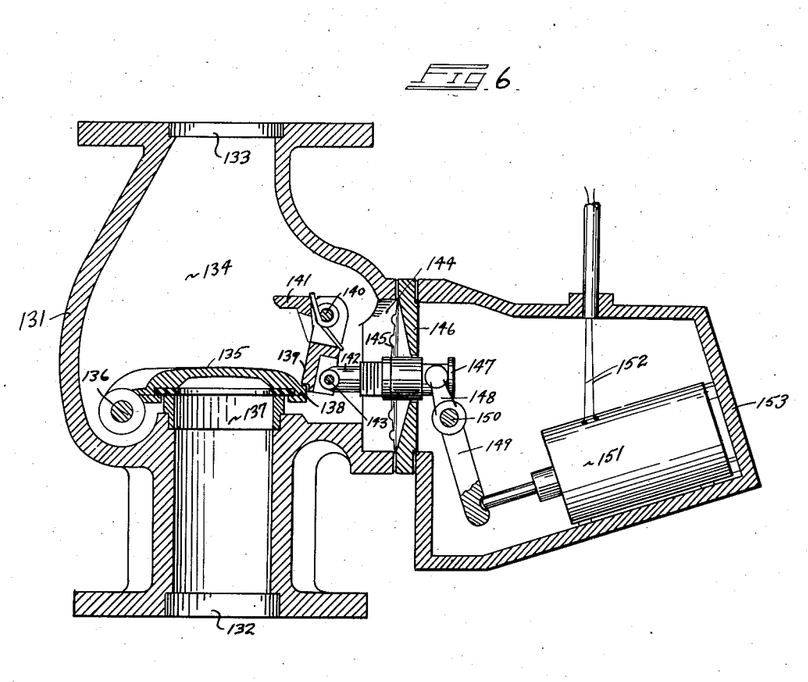
Figure 6 is a cross sectional elevation of a modified form of electrically actuated valve capable of being used with the sprinkler system illustrated in Figure 3.

To those experienced in the art, it is obvious that modifications of the automatic valves 27 and 62 heretofore described in connection with the sprinkler systems illustrated in Figures 1 and 3, respectively, are possible. In Figures 5 and 6 of the drawings, modified forms of such valves are illustrated. A modified valve adapted to be pneumatically actuated and adapted for use, for example, with the sprinkler system illustrated in Figure 1, is shown in Figure 5 and comprises a valve body 100 having an inlet orifice 101 and an outlet orifice 102, the valve body forming a valve chamber 103 in which chamber a clapper 104, pivoted by means of a pivot 105 to the valve body 100, is adapted to close the inlet orifice 101 which is provided with a seat ring 106 at its point of communication with the valve chamber 103. The clapper 104 is provided with an extending latch portion 107 which is adapted to be held down by means of a keeper 108 pivoted by means of a pivot 109 to the valve body 100. A separate non-reseating latch 110 is positioned on the pivot 109 and is adapted to prevent the clapper 104 from reseating upon the seat ring 106 after the clapper 104 has been unlatched. The non-reseating latch 110 is held in operatable position by means of a spring positioned about the pivot 109. The clapper 104 moves the non-reseating latch 110 upwardly in order to swing past the same when it opens. The spring about the pivot 109 will return the non-reseating latch 110 to the position shown in Figure 5 so that the clapper 104 will come into engagement therewith and be incapable of reseating. Attached to the keeper 108 by means of a pivot 111 there is a keeper bar 112 which passes centrally through and is affixed to a flexible diaphragm 113 which is affixed at its outermost edge to the annular edges of an opening 114 in the valve body 100. It will thus be observed that the diaphragm 113 permits the horizontal movement of the keeper bar 112 while at the same time forming a fluid-tight closure across the opening 114 of the valve 100. Positioned adjacent the diaphragm 113 and formed in a manner so as not to interfere with the flexibility thereof, there is a plate 115 provided with a centrally positioned opening through which the keeper bar 112 passes. The plate 115 serves to prevent the damaging of the flexible diaphragm 113 at such times as the clapper 104 is open, by forming a structural support therefor. The latch bar 112 extends beyond the plate 115 and terminates in a T shaped member 116 which is adapted to be engaged by a pair of lever arms 117 which in turn form part of a lever 118 pivoted to a mechanism housing 119 of the device by means of a pivot 120. The lower end of the lever arms 118 are pivoted by means of a pivot 121 to a connecting rod 122 which has a piston block 123 formed on the opposite end thereon. A coil spring 124 is positioned between a portion of the mechanism housing 119 and the piston block 123. The mechanism housing 119 includes a cup shaped depression 125 across which a flexible diaphragm 126, preferably formed of rubber or other suitable resilient material, is positioned, the diaphragm 126 being positioned by means of a cap 127, the diaphragm, positioned between the cap 127 and the piston block 123, normally rests against the said cap 127. The cap 127 is provided with a centrally positioned orifice 128 which is adapted to receive a tubular connection 129 through which compressed gases may be directed against the diaphragm 126 at such times as the sprinkler system to which the device is attached goes into operation. Such operation results in the movement of the diaphragm 126 toward the cup like depression 125 and the resulting movement of the piston block 123 and connecting rod 122, which in turn moves the lever arms 118 and 117 so as to move the keeper bar 112 horizontally and thus unlatch the clapper 104 by moving the keeper 108 away from the latch thereof.

By referring now to Figure 6, a further modification of the automatic valve may be seen which modification comprises the structure very similar to that heretofore described and illustrated in Figure 5 with the exception that an electrically actuated solenoid is employed to originate the motion necessary for unlatching the clapper.

In Figure 6 the body of the automatic valve is indicated by the numeral 131; it is provided with an inlet orifice 132 and an outlet orifice 133 and forms a valve chamber 134. A clapper 135 is pivoted to the valve body 131 by means of a pivot 136 and serves to close the inlet orifice 132 at a point where it communicates with the valve chamber 134 by way of a seat ring 137. A latch portion 138 of the clapper 135 extends outwardly at one side and is adapted to be retained beneath a keeper 139 which in turn is pivoted to the valve body 131 by means of a pivot 140. An anti-reseating latch 141 is also provided. A keeper bar 142 is pivoted to the keeper 139 by means of a pivot 143 and extends outwardly of the valve body 131 through an opening 144, passing centrally through and affixed in a fluid-tight manner to a flexible diaphragm 145. The flexible diaphragm is affixed across the opening 144 in the valve body 131 in a fluid-tight manner. A plate 146 is positioned adjacent the diaphragm 145 to lend structural support thereto at such times as the clapper 135 is unlatched and open. The keeper bar 142 extends beyond the plate 146, passing through a central opening therein and terminates in a T headed member 147. Lever arms 148 forming a part of an actuating lever 149 pivoted to the valve body by means of a pivot 150, serve to transmit motion to the keeper 139, so as to unlatch the clapper 135, such motion being imparted to the lever 149 by means of a solenoid 151, the solenoid 151 being of a size capable of sufficient movement to unlatch the clapper 135. The solenoid is electrically connected to a pressure actuated switch on the sprinkler system by means of wires 152 and is enclosed in a housing 153.

This form of solenoid actuated valve can be employed with the sprinkler system heretofore described and illustrated in Figure 3 and it will be observed that it can be employed in connection with the sprinkler system illustrated in Figure 1 provided that the same is modified to the extent only of adding a pressure operated electrical switch so that the solenoid actuated valve may be actuated at such times as the compressed gases are released into the pressure tank and pressure actuated switch of the sprinkler system.

It will be observed that the sprinkler system illustrated in Figure 3 can be modified so as to eliminate the electrically actuated automatic valve 62 by substituting therefor the pneumatically actuated automatic valve illustrated in Figures 1 and 2 or its modified form as illustrated in Figure 5. In such a modification, a tubular connection such as illustrated in Figure 1 at 30 can be used to connect the pneumatically actuated valve directly to the compressed gas connection so that the pneumatic valve will operate as described hereinbefore in connection with the modifications referred to.

I claim:

1. In a fire extinguishing system, the combination of a fluid filled supply tank, a set of fluid filled conducting pipes communicating therewith, sprinklers on the said pipes, a riser communicating with the said pipes and terminating above the uppermost sprinkler, a compressed gas source for establishing pressure in the said supply tank to force the contents therefrom and an auxiliary valve controlling a connection between the said riser and an auxiliary fluid supply, a compressed gas release mechanism, a fluid pressure responsive mechanism positioned on said riser connected to said compressed gas release mechanism for actuating the said release mechanism and thereby opening the said gas source and means actuated by gas from the said source for opening the said auxiliary valve.

2. In a fire extinguishing system, the combination of a fluid filled supply tank, a set of fluid filled conducting pipes communicating therewith, sprinklers on the said pipes, a riser communicating with the said pipes and terminating above the uppermost sprinkler, a compressed gas source for establishing pressure in the said supply tank to force the contents therefrom and a secondary fluid supply source connected to the said riser, an auxiliary valve controlling the said secondary fluid supply source, a compressed gas release mechanism, a fluid pressure responsive mechanism positioned on the said riser and connected to said compressed gas release mechanism, for actuating the said release mechanism and thereby opening the said gas source and means actuated by gas from the said source for opening the said auxiliary valve.

3. In a sprinkler system including a set of distributing pipes and sprinklers, the combination of a fluid filled supply tank and a secondary fluid supply source, the said secondary fluid supply source controlled by means of an automatic valve including a clapper and a latch therefor, means for applying pressure to the said fluid filled supply tank and opening the said auxiliary valve by unlatching the said clapper thereof, said means including a fluid pressure responsive mechanism in communication with the said distributing pipes of the sprinkler system and a compressed gas source for establishing pressure in the said supply tank and a gas releasing mechanism, the said gas releasing mechanism responsive in operation to the said fluid pressure responsive mechanism and the said auxiliary valve responsive in operation to the release of gas from the compressed gas source.

4. A fire extinguishing system provided with dual sources of fluid supply and including a set of fluid conducting pipes communicating therewith, sprinklers on the said pipes and fluid level responsive means in connection with the said pipes for actuating the said system upon a change in the fluid level in the pipes as upon the opening of a sprinkler in controlling a fire, one of the said dual fluid supply sources comprising a pressure tank provided with a compressed gas source and a compressed gas release mechanism for releasing the compressed gas into the said supply tank, the said compressed gas release mechanism actuated by the said fluid level responsive mechanism, the other one of the said dual fluid supply sources comprising a connection to an auxiliary fluid supply and having a valve including a clapper controlling the said connection, clapper releasing mechanism attached to and forming a part of the said valve and means connecting the said clapper releasing mechanism with the said compressed gas release mechanism and the compressed gas conveying connections thereof.

5. A fire extinguishing system including a set of fluid conducting pipes having sprinklers thereon and provided with dual sources of fluid supply, fluid level responsive means in connection with the said pipes for actuating the said system upon a change in the fluid level in the pipes as upon the opening of a sprinkler in controlling a fire, one of the said dual fluid supply sources comprising a pressure tank provided with means for establishing pressure therein, the said means controlled by the said fluid level responsive means, the other one of the said dual fluid supply sources comprising a connection to an auxiliary fluid supply and having a valve including a clapper controlling the said connection, an electrically actuated clapper releasing mechanism attached to and forming a part of the said valve, and means connecting the said electrically actuated clapper releasing mechanism with the said pressure establishing means, the said pressure establishing means including a pressure actuated electric switch.

6. In a fire extinguishing system, the combination of a set of fluid filled conducting pipes having sprinklers thereon and dual fluid supply sources, one of the said dual fluid supply sources comprising a fluid filled supply tank, a compressed gas source for establishing pressure in the said supply tank to force the fluid contents therefrom, a fluid pressure responsive mechanism positioned on the said fluid filled conducting pipes and connected to a main compressed gas release mechanism and adapted to cause the same to release compressed gases into the said supply tank from the said compressed gas source upon a change in fluid pressure in the said pipes, a pressure operated electric switch in connection with said compressed gas release mechanism, the other one of the said dual fluid supply sources comprising a connection to an auxiliary fluid supply and having a valve including a clapper controlling the said connection, an electrically actuated clapper releasing mechanism attached to and forming a part of the said valve, an electric circuit connecting the said electrically actuated clapper releasing mechanism with the said electric switch of the said compressed gas release mechanism.

7. A fire extinguishing apparatus comprising suitable piping having normally closed sprinklers thereon, said sprinklers being disposed to cover a fire zone, a valve normally closed and shutting off the pressure of fire extinguishing fluid to the said sprinklers, restraining means normally holding said valve closed against pressure of the said extinguishing fluid, trip devices for freeing the restraining means to permit the valve to open and a primary fluid supply comprising a fluid filled pressure tank in communication with said sprinklers, means for establishing pressure in the said fluid filled tank to force the contents therefrom, the said means comprising a compressed gas source and a releasing mechanism, and means for controlling the said releasing mechanism comprising a relatively sensitive controlling device located on and in communication with the said piping and means extending from the said controlling device to the said releasing mechanism for operating the latter, and means extending from the said releasing mechanism to the said trip devices for operating the latter when the former is actuated.

8. A pressure tank sprinkler system installation for controlling and extinguishing fires consisting of a fluid filled pressure tank and distributing pipes containing fluid and having sprinklers arranged to open and apply fire extinguishing fluid when a fire arises, means for establishing pressure in the said pressure tank so as to force the fluid contents therefrom through the said sprinklers, said means including a suitable pressure source and a releasing mechanism, a valve controlling the admission of fire extinguishing fluid from a secondary fluid source to said piping and provided with restraining means for holding the same in closed position, a trip device operating on said restraining means to free said valve, and means extending from the said release mechanism to said trip device for operating the latter, a fluid pressure responsive device located on the said distributing piping, and means extending from the said fluid pressure device to the said main releasing mechanism for operating the latter.

9. In a fire extinguishing apparatus, including a distributing system normally filled with extinguishing liquid, and a pressure tank fluid supply source and means for applying fluid pressure to the said pressure tank; an auxiliary fluid supply source connected with said distributing system by way of an automatic valve, means actuating the said automatic valve in response to the application of pressure to the said pressure tank.

10. In a fire extinguishing apparatus including a fluid filled supply tank, and a riser and a set of distributing pipes having sprinklers communicating therewith, and means for establishing pressure in the said supply tank to force the contents therefrom; an auxiliary valve controlling a connection between said riser and an auxiliary fluid supply, means operatively connecting said auxiliary valve with said compressed gas source, for opening said auxiliary valve in response to fluid pressure released from said compressed gas source upon actuation of the said fire extinguishing system.

11. In a fire extinguishing apparatus including a distributing system having sprinklers, a pressure tank fluid supply source and means for applying fluid pressure to the said pressure tank; an auxiliary fluid supply source connected with the said distributing system by way of an automatic valve, means for actuating the said automatic valve in response to the application of pressure to the said pressure tank.

HARRY N. RIDER.